US012642166B2

(12) United States Patent  
Fehr

(10) Patent No.: US 12,642,166 B2  
(45) Date of Patent: Jun. 2, 2026

(54) PEANUT DIGGER-SHAKER-INVERTER WITH HYDRAULIC MOTORS IN LIEU OF BEVEL GEARS

(71) Applicant: Fehr's Industrial Manufacturing, LLC, Seminole, TX (US)

(72) Inventor: John Fehr, Seminole, TX (US)

(73) Assignee: Fehr's Industrial Manufacturing, LLC, Seminole, TX (US)

( * ) Notice: Subject to any disclaimer, the term of this patent is extended or adjusted under 35 U.S.C. 154(b) by 563 days.

(21) Appl. No.: 18/150,070

(22) Filed: Jan. 4, 2023

(65) Prior Publication Data

US 2023/0210046 A1     Jul. 6, 2023

Related U.S. Application Data

(60) Provisional application No. 63/296,371, filed on Jan. 4, 2022.

(51) Int. Cl.  
*A01D 29/00* (2006.01)  
*A01D 25/00* (2006.01)

(52) U.S. Cl.  
CPC ........... *A01D 29/00* (2013.01); *A01D 25/005* (2013.01)

(58) Field of Classification Search  
CPC .............................. A01D 29/00; A01D 25/005  
See application file for complete search history.

(56) References Cited

U.S. PATENT DOCUMENTS

| | | | |
|---|---|---|---|
| 1,284,449 A | 11/1918 | Prior | |
| 2,311,982 A | 2/1943 | Goodrich | |
| 2,372,586 A | 3/1945 | Kraus | |
| 2,528,689 A | 11/1950 | Flynt | |
| 2,540,655 A | 2/1951 | Collins | |
| 2,722,794 A | 11/1955 | McGee | |
| 2,855,058 A | 10/1958 | Krier et al. | |
| 2,902,997 A * | 9/1959 | Hawkins ................ A01D 29/00 |
| | | | 171/61 |
| 2,999,547 A | 9/1961 | Long | |
| 3,181,617 A | 5/1965 | Wallace | |
| 3,260,314 A | 7/1966 | Edwards | |

(Continued)

OTHER PUBLICATIONS

International Search Report and Written Opinion of the International Searching Authority dated Apr. 5, 2023, in connection with International Application No. PCT/US2023/010128, 6 pages.

(Continued)

*Primary Examiner* — Matthew R Buck

(57) ABSTRACT

A digger-shaker-inverter for harvesting rooted plants includes a plurality of row units, with each row unit comprising first and second carrying belts spaced to grip opposite sides of vines on the rooted plants. A first pulley drives the first carrying belt and a second pulley driving the second carrying belt. A first hydraulic motor is mounted to selectively cause rotation of the first pulley, and a second hydraulic motor is mounted to selectively cause rotation of the second pulley. A supply line connected to a tractor's hydraulic system provides hydraulic fluid to the first and second hydraulic motors, which are connected in daisy-chain fashion with an outlet of one connected to an inlet of the second, and the outlet of the second of the hydraulic motors connected to an inlet for a hydraulic motor of another row unit.

5 Claims, 4 Drawing Sheets

(56) References Cited

U.S. PATENT DOCUMENTS

| | | | |
|---|---|---|---|
| 3,496,713 | A | 2/1970 | Reinhardt et al. |
| 3,497,013 | A | 2/1970 | Baker |
| 3,693,721 | A | 9/1972 | Arnold et al. |
| 3,726,345 | A | 4/1973 | Harrell et al. |
| 3,743,024 | A * | 7/1973 | Mayo ................... A01D 25/048 171/25 |
| 3,989,111 | A | 11/1976 | Hobbs |
| 4,185,696 | A * | 1/1980 | Williams ............... A01D 33/14 171/110 |
| 4,230,188 | A | 10/1980 | Paulk |
| 4,326,590 | A | 4/1982 | Yancey |
| 4,442,979 | A | 4/1984 | Kupper |
| 4,470,245 | A | 9/1984 | Agadi |
| 4,607,703 | A | 8/1986 | Wang |
| 4,633,955 | A | 1/1987 | Gresham |
| 5,138,826 | A | 8/1992 | Hobbs |
| 5,588,494 | A | 12/1996 | Pickett et al. |
| 6,095,253 | A | 8/2000 | Crowley |
| 7,555,882 | B2 | 7/2009 | Clauss et al. |
| 9,532,501 | B2 | 1/2017 | Francis et al. |
| 11,212,958 | B2 | 1/2022 | Fehr |
| 2003/0188522 | A1 | 10/2003 | Robinson, Sr. |

OTHER PUBLICATIONS

"Fehrs Peanut Digger Video," Fehrs Industrial Manufacturing, LLC., https://www.youtube.com/watch?v=6jSyfzu8w58&feature= youtu.be, Oct. 11, 2016, 2 pages.

* cited by examiner

1

PEANUT DIGGER-SHAKER-INVERTER WITH HYDRAULIC MOTORS IN LIEU OF BEVEL GEARS

RELATED APPLICATIONS AND PRIORITY CLAIM

This application claims priority to U.S. Provisional Patent Application No. 63/296,371 filed Jan. 4, 2022. The content of the above-identified patent document(s) is incorporated herein by reference.

TECHNICAL FIELD

The present application relates generally to farm equipment for harvesting peanuts and more particularly to a combination digger-shaker-inverter for harvesting crops such as peanuts.

BACKGROUND

U.S. Pat. No. 11,212,958, incorporated herein by reference, discloses a design for a peanut digger-shaker-inverter. The bevel gears in the drive system of the design disclosed in that patent may clog with dirt and other debris, even if a protective housing is built around the gears. Rotation of the bevel gears also represents an additional point of mechanical failure.

SUMMARY OF THE DISCLOSURE

For a more complete understanding of the present disclosure and its advantages, reference is now made to the following description taken in conjunction with the accompanying drawings, in which like reference numerals represent like parts:

The design disclosed in the above-referenced patent includes a gear box that powers a driveline and a series of bevel gears. See FIGS. 3-4 below, which depict portions of a digger-shaker-inverter according to the above-referenced patent. In the improved design disclosed herein, the gearbox, driveline, and bevel gear system are replaced instead with hydraulic motors, to be driven via the tractor's hydraulic system.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
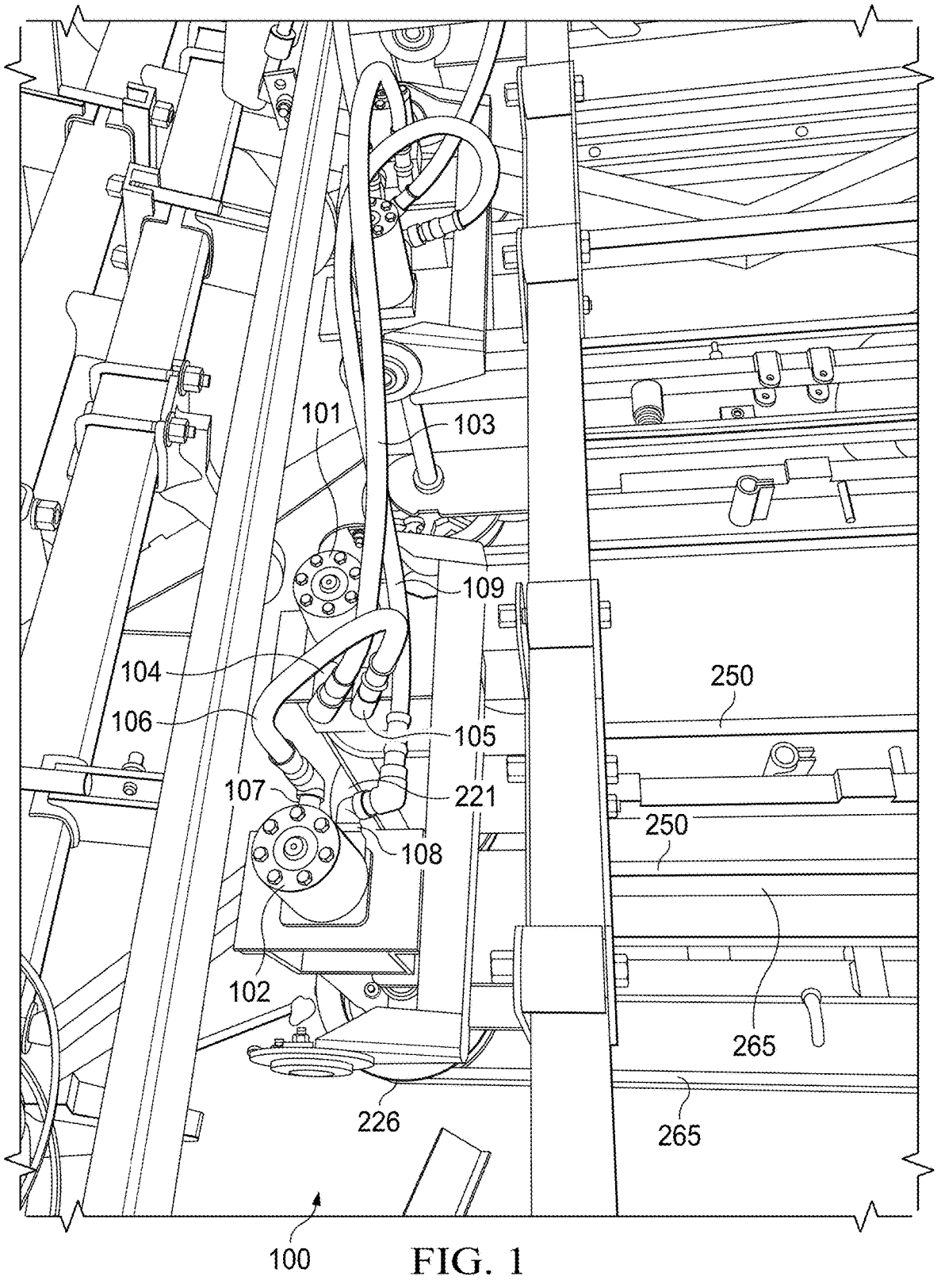
FIGS. 1 and 2 depict a drive system for an exemplary digger-shaker-inverter for harvesting rooted plants according to embodiments of the present disclosure, utilizing hydraulic motors in lieu of bevel gears on a common drive shaft.
Figure 2:
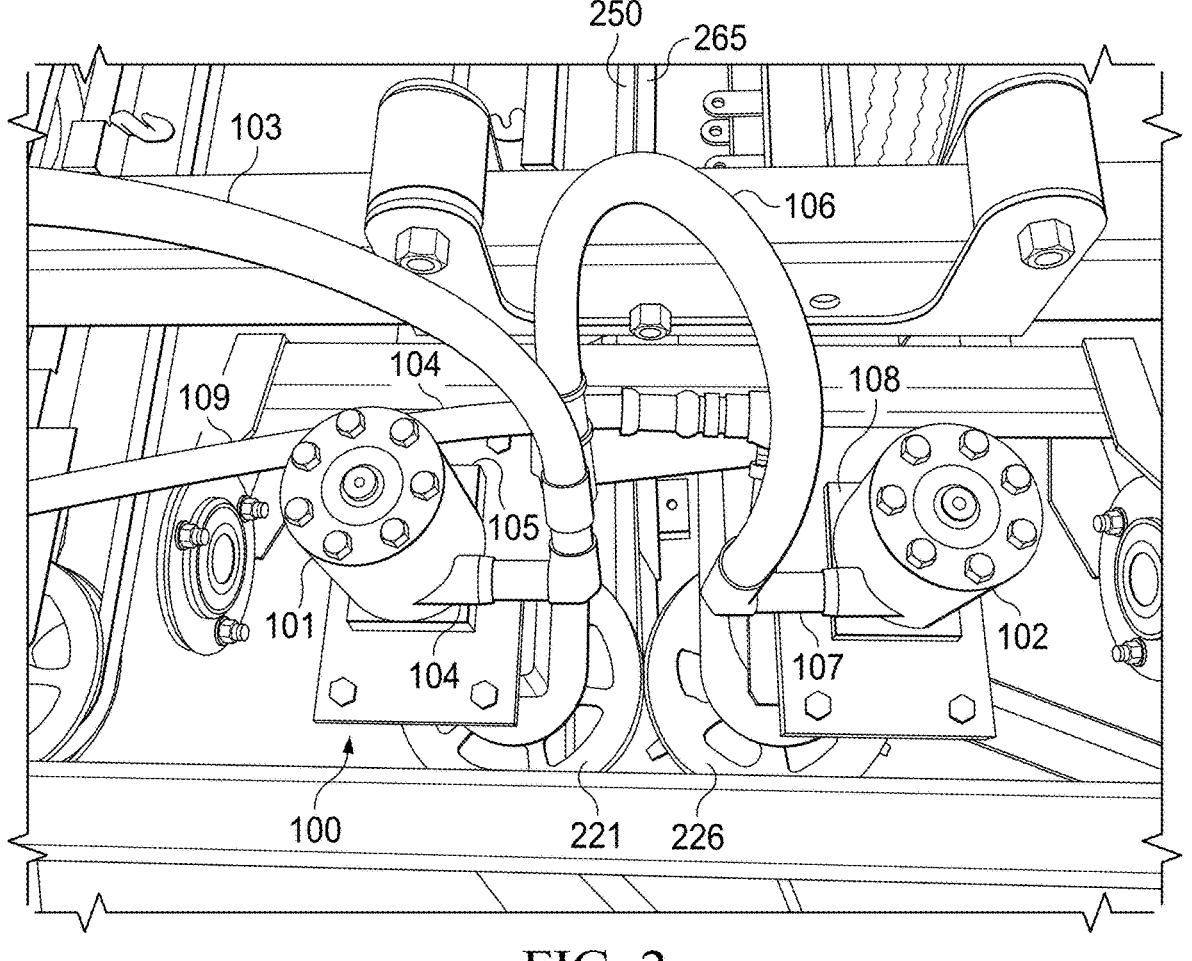
Figure 3:
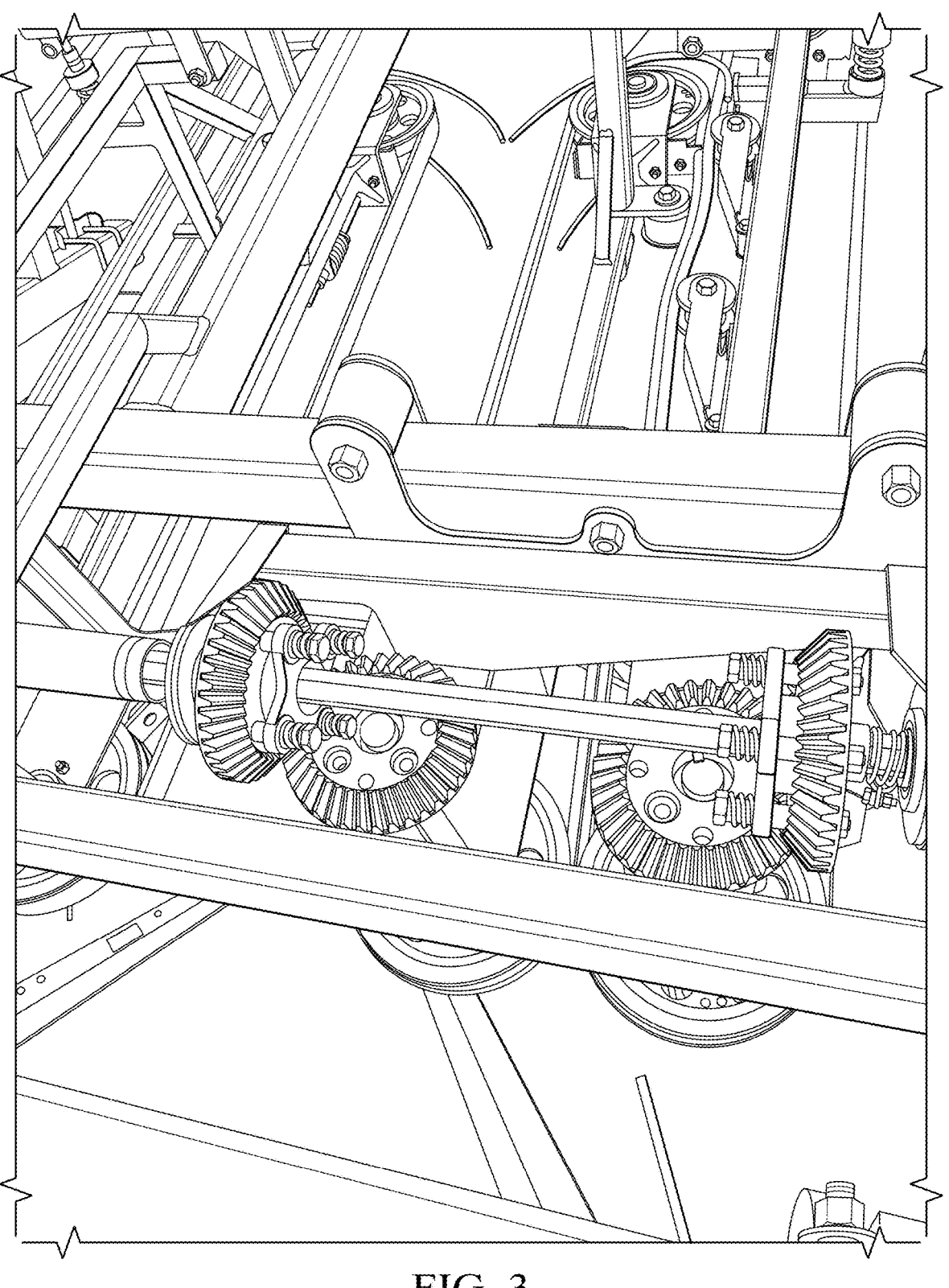
FIGS. 3 and 4 depict a drive system for an exemplary digger-shaker-inverter for harvesting rooted plants according to embodiments of the above-referenced patent.
Figure 4:
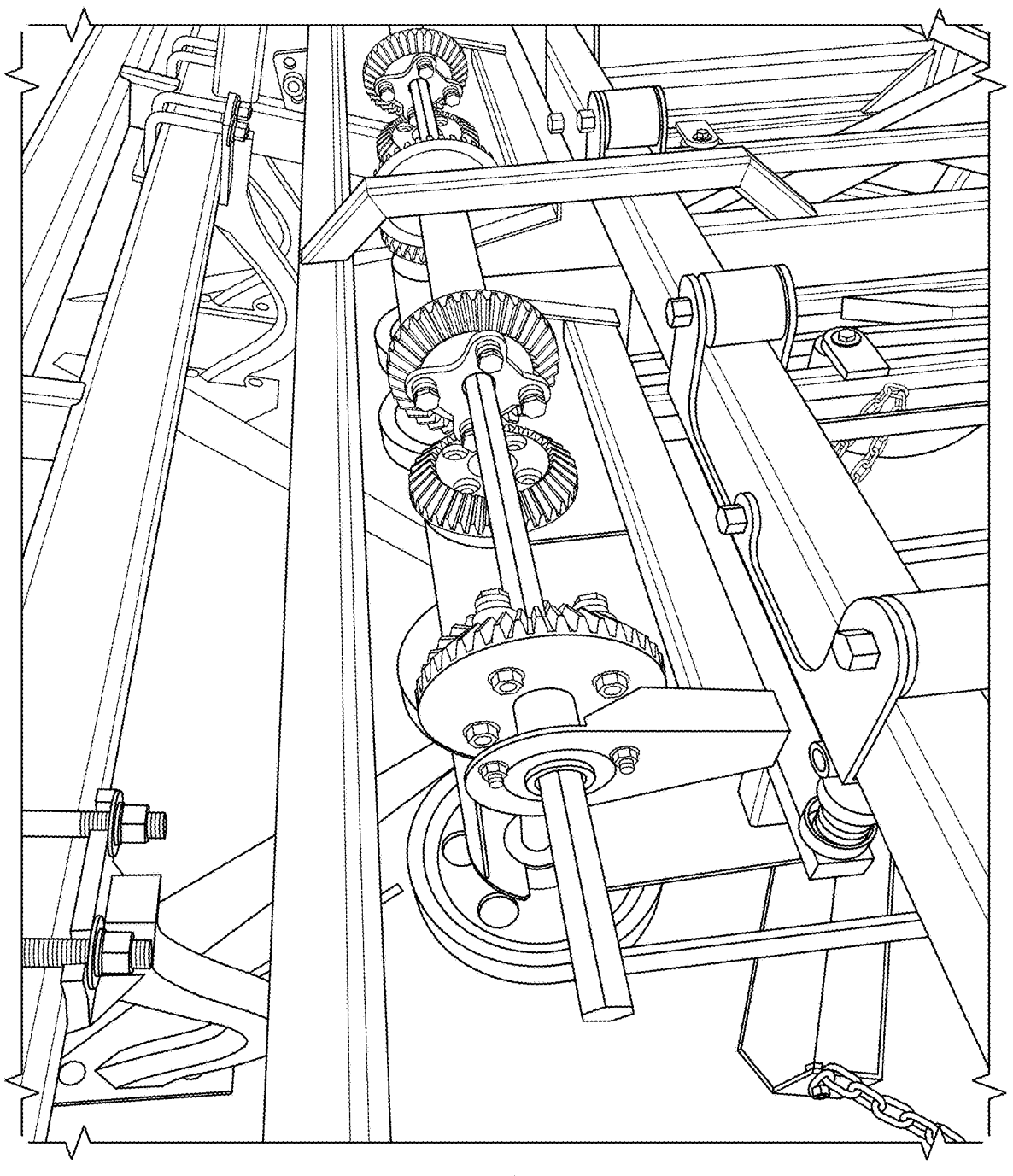

FIGS. 1 and 2, discussed below, and the various embodiments used to describe the principles of the present disclosure are by way of illustration only and should not be construed in any way to limit the scope of the invention. Those skilled in the art will understand that these principles may be implemented in any type of suitably arranged device or system.

FIGS. 1 and 2 depict a drive system for an exemplary digger-shaker-inverter for harvesting rooted plants according to embodiments of the present disclosure, utilizing hydraulic motors in lieu of bevel gears. FIG. 1 is an elevate perspective view, and FIG. 2 is an elevated perspective view rotated relative to FIG. 1. Within the improved drive system 100, a first carrying belt 250 and a second carrying belt 265 are each endless belts configured in a loop and operatively mounted around a respective front pulley 221, 226 and a respective back pulley (not shown in FIG. 1). A first hydraulic motor 101 is mounted and operatively connected to drive the front pulley 221, and a second hydraulic motor 102 is mounted and operatively connected to drive the front pulley 226. Support plates for mounting of the hydraulic motors 101, 102 above the respective front pulleys 221, 226 are secured to a cross member of the digger-shaker-inverter frame.

A supply line 103 provides hydraulic fluid from the hydraulic system of the tractor connected to and pulling the digger-shaker-inverter. In the example shown, the supply line 103 receives hydraulic fluid from another set of hydraulic motors operating another pair of carrying belts on the digger-shaker-inverter. A supply line for the other set of hydraulic motors receives hydraulic fluid from the tractor's hydraulic system. The supply line 103 is connected to the inlet 104 of one hydraulic motor 101. The outlet 105 of that hydraulic motor 101 is connected by a connecting line 106 to the inlet 107 of the second hydraulic motor 102. The outlet 108 of the second hydraulic motor 102 is connected by a return line 109, to return the hydraulic fluid (ultimately) to the tractor's hydraulic system.

The digger-shaker-inverter drive system of the present disclosure takes advantage of an available source of hydraulic power, while eliminating bevel gears used in prior designs.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A digger-shaker-inverter configured to be connected to and pulled by a tractor when harvesting rooted plants, the digger-shaker-inverter including a plurality of row units, each row unit comprising:

first and second carrying belts spaced to grip opposite sides of vines on the rooted plants;

a first pulley driving the first carrying belt;

a second pulley driving the second carrying belt;

a first hydraulic motor mounted to selectively cause rotation of the first pulley, the first hydraulic motor including a first hydraulic fluid inlet and a first hydraulic fluid outlet, the first hydraulic fluid inlet connected to a supply line for receiving hydraulic fluid from a hydraulic system of the tractor; and a second hydraulic motor mounted to selectively cause rotation of the second pulley, the second hydraulic motor including a second hydraulic fluid inlet and a second hydraulic fluid outlet, the second hydraulic fluid inlet connected by a connecting line to the first hydraulic fluid outlet for receiving hydraulic fluid from the first hydraulic motor and the second hydraulic fluid outlet connected to a return line for returning hydraulic fluid that is fluidically coupled to the hydraulic system of the tractor.

2. The digger-shaker-inverter of claim 1, wherein the supply line connected to the hydraulic system of the tractor provides hydraulic fluid to the first and second hydraulic motors.

3. The digger-shaker-inverter of claim 2, wherein the connecting line carries hydraulic fluid from the first hydraulic fluid outlet of the first hydraulic motor to the second hydraulic fluid inlet of the second hydraulic motor.

4. The digger-shaker-inverter of claim 3, wherein the return line carries hydraulic fluid from the second hydraulic fluid outlet of the second hydraulic motor for a first of the plurality of row units to the first hydraulic fluid inlet of the first hydraulic motor for a second of the plurality of row units.

5. The digger-shaker-inverter of claim 3, wherein the return line carries hydraulic fluid from the second hydraulic fluid outlet of the second hydraulic motor for a first of the plurality of row units to the hydraulic system of the tractor.

\* \* \* \* \*